Patented June 21, 1927.

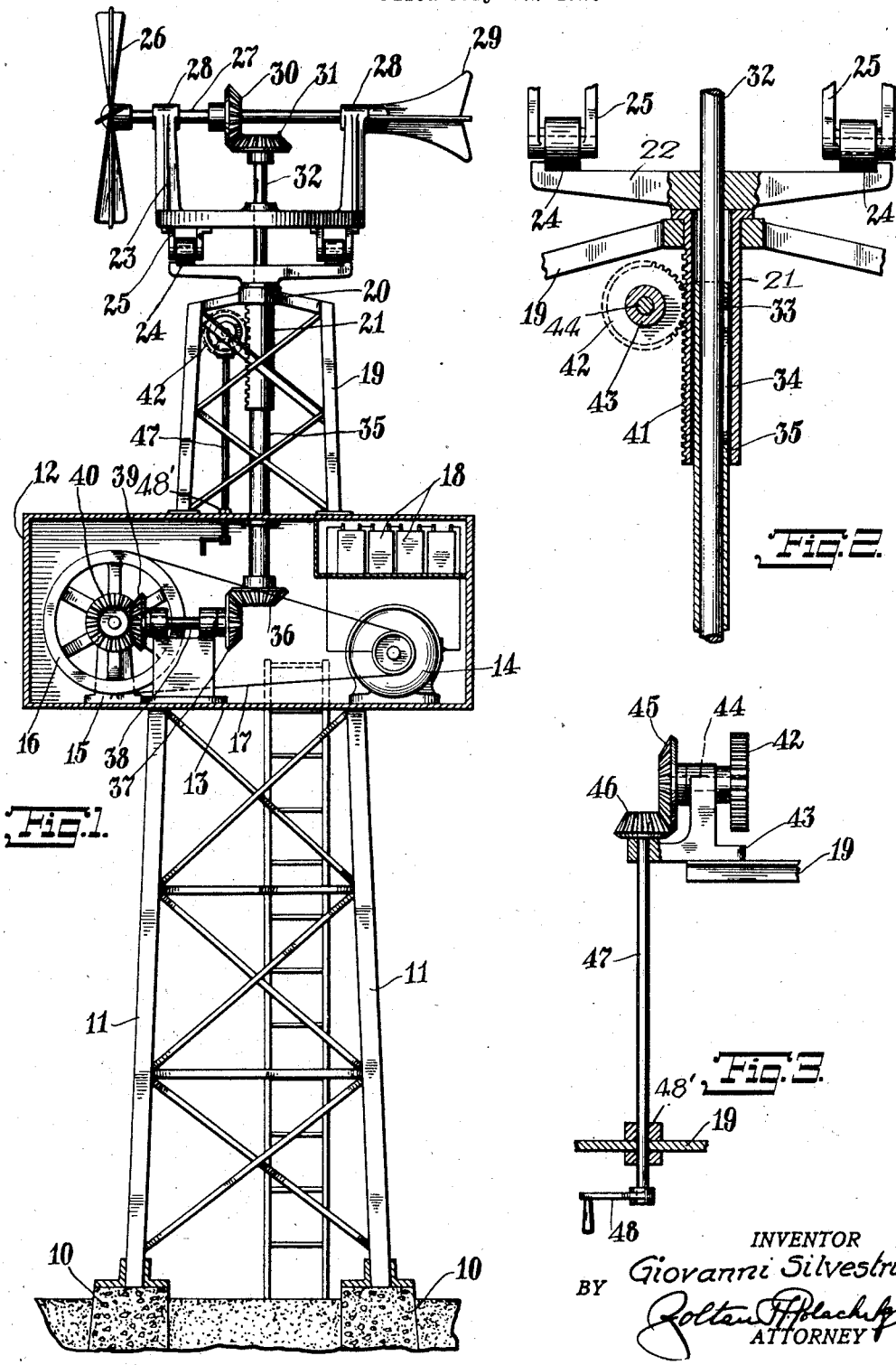

1,633,460

UNITED STATES PATENT OFFICE.

GIOVANNI SILVESTRIN, OF PORT ARTHUR, ONTARIO, CANADA, ASSIGNOR OF ONE-HALF TO GIUSEPPE NOBILE.

WIND-POWER-GENERATING DEVICE.

Application filed July 26, 1926. Serial No. 124,845.

This invention relates generally to wind power generating devices, the invention having more particular reference to a novel type of wind power generating device.

The invention has for an object the provision of an adjustable wind power generating device.

For further comprehension of the invention, and of the objects and advantages thereof, reference will be had to the following description and accompanying drawings, and to the appended claims in which the various novel features of the invention are more particularly set forth.

Fig. 1 of the drawings, is a perspective view of my improved wind power generating device.

Fig. 2 is an enlarged fragmentary sectional view of the adjustable means of raising and lowering the wind mill.

Fig. 3 is a detail view of the method of operating the device as illustrated in Fig. 2.

As here embodied my improved wind power generating device comprises foundations 10, adapted to support a structure 11, of any suitable size, and preferably of structural steel or the like, adapted to support a frame work 12, and a floor 13 upon which is mounted an electric generator 14, and supports 15 adapted to rotatably support a fly wheel 16, operatively connected to the electric generator 14 by means of the belt 17. The storage batteries 18, supported by the frame work 12 are connected to the electric generator 14 and to any desired power lines, not shown in the accompanying drawings, as a means of supplying electric power. The superstructure 19 is mounted on the above mentioned frame work 12, and extends upward therefrom, and is adapted to slidably support as at 20, at its upper extremity, a tubular member 21, having attached thereto at its extended extremity. a circular track 22, adapted to rotatively support a supporting member 23, by means of the rollers 24, rotatively mounted on the brackets 25 attached to the supporting member 23. The wind mill 26, comprising a plurality of vanes, is attached at one extremity of the shaft 27, which is rotatively mounted in the supporting member 23, as at 28. The tail piece 29 is attached to the supporting member 23 and extends therefrom, directly opposite to the wind mill 26, so as to cause the wind mill 26 to point or face toward the direction of the prevailing wind.

The bevel pinion 30 is attached to the shaft 27 and meshes with a bevel pinion 31 attached to the shaft 32, which extends downward therefrom, and has attached near its lower extremity a depending pin 33, adapted to engage an elongated slot 34 formed in the upper extremity of the tubular member 35, which has attached at its lower extremity a bevel pinion 36 meshing with a bevel pinion 37 attached to the shaft 38 which has attached thereto a bevel pinion 39, meshing with a bevel pinion 40 attached to the above mentioned fly wheel 16. The above mentioned rotatable members being mounted in suitable bearings or supports. The above described construction being such as will permit the wind mill 26, when in any extended position, when rotated by the wind to rotate or drive the electric generator 14 so as to generate electric power or current which is transmitted to and stored in the batteries 18 until required for use.

The above mentioned tubular member 21, is positioned outside the said shaft 32 and the said tubular member 35, and has cut or formed on its outer periphery teeth 41, so as to form a rack gear, meshing with a pinion 42, attached to the shaft 44, rotatively mounted in the support 43, attached to the super-structure 19, the bevel pinion 45, is attached to the shaft 44, and meshes with a bevel pinion 46 attached to the shaft 47 rotatively mounted in the said support 43 and in a support 48' attached to the super-structure 19. The shaft 47 extends downward, and has attached, at its lower extremity a crank 48, the later described construction being such as will permit the crank 48 when turned or rotated to extend or lower the wind mill 25, as may be desired, to allow the said wind mill the full advantages of the prevailing wind, and as would also be desirable when making repairs or maintenance work thereto.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. A wind power generating device comprising a super-structure having an opening in the upper extremity thereof, a substantially vertical tubular shaft disposed longitudinally of said super-structure, a sleeve slidably mounted on the upper end of said shaft and slidably mounted in said opening comprising a flange on the upper extremity thereof adapted to engage the edge of said super-structure around said opening for limiting the downward movement of said sleeve, a disc support mounted on said flange, a turn-table supported thereon, an inner tubular shaft slidably mounted in said first mentioned tubular member and rotatively mounted in said disc support and turn-table, a projection rigidly mounted on the side of said inner tubular member disposed in a longitudinal slot in said outer tubular shaft for imparting rotary movement thereto, said inner tubular shaft being extensible relative to said outer tubular shaft for permitting raising and lowering of said disc support and turn-table, and a wind mill rotatively mounted on said turn-table adapted to be raised and lowered therewith and to rotate said inner tubular shaft.

2. A wind power generating device comprising a super-structure, a sleeve slidably mounted in said super-structure, a plurality of rack teeth, on the side of said sleeve, a gear rotatively mounted on said structure and meshed with said rack teeth, a crank rotatively mounted on said super-structure and connected with said gear for rotating the same to raise and lower said sleeve, a disc support mounted on the end of said sleeve, a turn-table rotatively mounted on said disc support, a wind mill mounted on said turn-table, an extensible shaft comprising an upper and lower telescoping tubular member, and a pin on said upper tubular member slidably mounted in a slot in said lower tubular member adapted to impart rotation from said upper tubular member to said lower tubular member and to permit extensibility of said upper tubular member when said disc support and turn-table are raised.

3. A wind power generating device comprising a super-structure, a support slidably mounted on said super-structure comprising a tubular sleeve, a rack on the side of said tubular sleeve, means comprising a gear rotatively mounted on said super-structure for raising and lowering said support, a wind mill mounted on said support, and an extensible shaft operatively connected at its upper end to said wind mill and at its lower end to a generator for conveying rotary movement of said wind mill to said generator and adapted to permit raising and lowering of said wind mill while maintaining a driving connection between the latter and said generator.

In testimony whereof I have affixed my signature.

GIOVANNI SILVESTRIN.